A. KAJANUS.
SPRING WHEEL.
APPLICATION FILED SEPT. 4, 1917.
1,303,329.
Patented May 13, 1919.
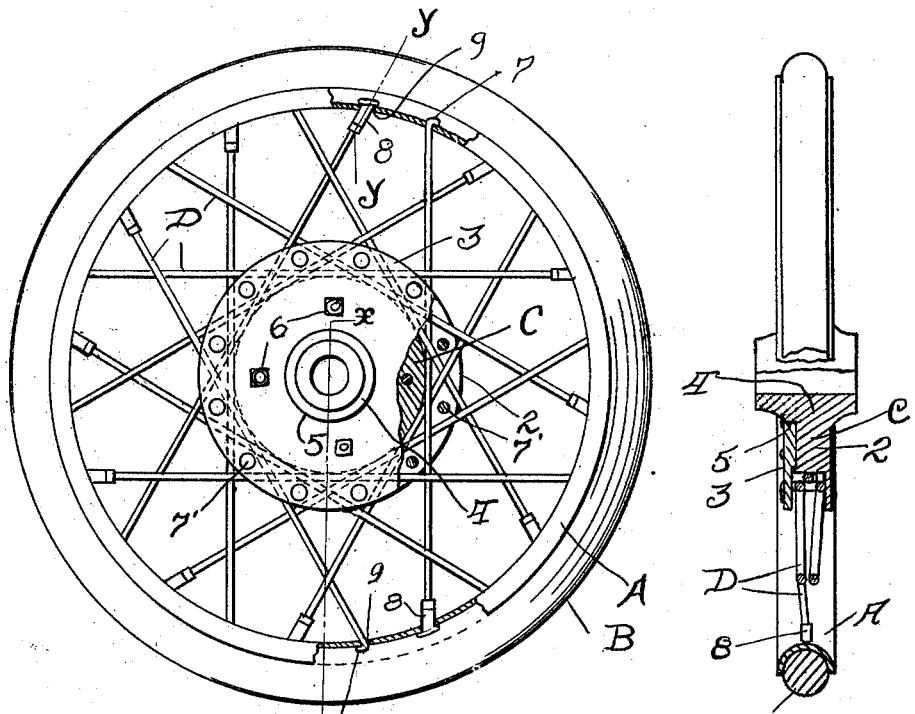
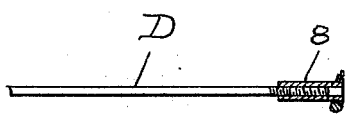
Inventor:
Abraham Kajanus,
by: S. Bradbury
Attorney.

UNITED STATES PATENT OFFICE.

ABRAHAM KAJANUS, OF VIRGINIA, MINNESOTA.

SPRING-WHEEL.

1,303,329. Specification of Letters Patent. Patented May 13, 1919.

Application filed September 4, 1917. Serial No. 189,457.

*To all whom it may concern:*

Be it known that I, ABRAHAM KAJANUS, a citizen of the United States, residing at Virginia, in the county of St. Louis and State of Minnesota, have invented a new and useful Improvement in Spring-Wheels, of which the following is a specification.

This invention relates to improvements in spring wheels, and particularly of that character of wheel in which the spokes of the wheel are arranged tangentially and freely with respect to the hub as a resilient medium which is used to produce a cushioning effect. The primary objects of this invention are simplicity of construction and greater effectiveness in use, whereby substantially the same resilient effect is produced by the use of a solid rubber tire as with the use of a pneumatic tire.

To these ends my invention comprises the features of construction and combination of parts hereinafter more particularly described and claimed.

In the accompanying drawing forming part of this specification, Figure 1 is a side elevation of my invention, parts of the structure being broken away and in section for the purpose of more clearly illustrating the construction thereof; Fig. 2 is a section taken on the line X—X of Fig. 1, and Fig. 3 is another section of a detail taken on the line Y—Y of Fig. 1.

In the drawing A indicates a rim which as illustrated is a grooved ring in which the solid tire B made of rubber or other suitable material is held. This tire may be of any construction desired. Arranged substantially concentrically of the rim is a hub comprising a solid core C on the two sides of which are arranged a pair of circular disks or plates 2 and 3, the plate 2 being formed integral with the sleeve 4 and core and the plate 3 being separate and the core passing centrally through an opening 5 therein and forming a bearing for the axle. It will be understood that this bearing may be of any suitable construction desired. The plates 2 and 3, and core C are fastened together by means of bolts 6 and 7' or other suitable means. The plates 2 and 3, and core C with their fastening means described produce a spool in the central portion of the wheel and by which the wheel may be mounted upon its axis. Suitable spokes D are provided, their ends being secured through the rim by means of hooks 7 at one end and sleeve nuts 8 threaded on their ends opposite those which are provided with the hooks, suitable openings 9 being provided in the rim through which said parts extend. The spokes are tangentially arranged in intersecting order, part of their intersections bearing against the core C of the hub and being held between the radiating flanges produced by the plates 2 and 3 on said core laterally of the wheel. It will be noted that each spoke extends between two spaced points of the rim and that the spokes are arranged evenly spaced about the rim, and that at the contact point on the core, the spoke is tangential to the core as well as to the rim. The intersecting portions of the spokes are also held from turning, except to a limited extent on the core by the transverse bolts 7' secured through the outstanding flange portions of the plates 2 and 3. In this manner, the hub is resiliently supported by the spokes and has freedom of movement to a limited extent revolubly within the wheel. There is also limited free play laterally of the wheel to allow for side thrust, the spokes sliding to a limited extent laterally on the core, as well as rotatably. The plate 3 can easily be removed by detaching the bolts 6 and 7' when desired for making repairs.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claim:

A spring wheel, comprising, in combination, a rim, a spool having a core and sides, one of said sides being detachably secured to said core and said sides projecting peripherally from said core to form a circular channel, intersecting spokes each attached by its opposite ends at spaced points of said rim, said spokes being tangentially arranged to and bearing freely and movably at their intersection on said core between said sides, and cross bars detachably secured to said sides for movably holding said spokes to transmit rotary motion and allow free sliding movement of the spokes on the periphery of said core.

In testimony whereof, I have signed my name to this specification.

ABRAHAM KAJANUS.